US012659341B2

(12) United States Patent
Huang et al.

(10) Patent No.: US 12,659,341 B2
(45) Date of Patent: Jun. 16, 2026

(54) THREAT INDICATOR ALERT GENERATION BASED ON PRIORITIZATION MODELS

(71) Applicant: Google LLC, Mountain View, CA (US)

(72) Inventors: Erik Shih-Hau Huang, Pasadena, CA (US); Benjamin Henry Walter, Austin, TX (US); Eric James Stennett, Austin, TX (US); Ricardo Correa, Austin, TX (US); Barbara Davila, Austin, TX (US); Benjamin Zachary Withnell, New York, NY (US); John Whitcomb, Spokane, WA (US); Jeremiah David Warren, Senoia, GA (US); Moses Daniel Schwartz, Clayton, CA (US)

(73) Assignee: Google LLC, Mountain View, CA (US)

( * ) Notice: Subject to any disclaimer, the term of this patent is extended or adjusted under 35 U.S.C. 154(b) by 161 days.

(21) Appl. No.: 18/511,538

(22) Filed: Nov. 16, 2023

(65) Prior Publication Data

US 2025/0097253 A1     Mar. 20, 2025

Related U.S. Application Data

(60) Provisional application No. 63/583,126, filed on Sep. 15, 2023.

(51) Int. Cl.
*H04L 9/40* (2022.01)
*H04L 41/16* (2022.01)
(52) U.S. Cl.
CPC .......... *H04L 63/1433* (2013.01); *H04L 41/16* (2013.01); *H04L 63/1425* (2013.01)

(58) Field of Classification Search
CPC .. H04L 63/1433; H04L 41/16; H04L 63/1425
See application file for complete search history.

(56) References Cited

U.S. PATENT DOCUMENTS

| | | | | |
|---|---|---|---|---|
| 9,210,185 B1 * | 12/2015 | Pinney Wood | ..... | H04L 63/1433 |
| 9,462,010 B1 * | 10/2016 | Stevenson | .............. | H04L 67/10 |
| 11,019,088 B2 * | 5/2021 | Pratt | .................. | H04L 63/1425 |
| 11,477,224 B2 * | 10/2022 | Ahn | ..................... | H04L 61/4511 |
| 11,539,720 B2 * | 12/2022 | Reybok, Jr. | ............. | H04L 63/14 |
| 12,015,644 B2 * | 6/2024 | Dubois | ................. | H04L 63/102 |
| 12,074,897 B1 * | 8/2024 | Sánchez | ................ | G06N 20/00 |

(Continued)

*Primary Examiner* — Stephen T Gundry
(74) *Attorney, Agent, or Firm* — Lowenstein Sandler LLP

(57) ABSTRACT

A method includes receiving, at a security platform, a plurality of threat indicators associated with current intrusive activities with respect to computing resources of a first entity and receiving, at the security platform, a plurality of threat datasets associated with prior intrusive activities with respect to computing resources associated with one or more entities including the first entity. The method further includes receiving, at the security platform, a plurality of environmental datasets associated with the computing resources of the first entity and determining an alert level associated with a first threat indicator of the plurality of threat indicators based on the plurality of threat datasets and the plurality of environmental datasets. The method further includes generating, responsive to the alert level satisfying an alert threshold criterion, an alert associated with the first threat indicator for one or more users of the first entity.

20 Claims, 6 Drawing Sheets

(56)                    References Cited

U.S. PATENT DOCUMENTS

| | | | |
|---|---|---|---|
| 2018/0041538 A1* | 2/2018 | DiValentin | H04L 63/1433 |
| 2018/0316708 A1* | 11/2018 | Strong | H04L 43/04 |
| 2019/0297096 A1* | 9/2019 | Ahmed | G06N 20/00 |
| 2020/0296124 A1* | 9/2020 | Pratt | H04L 63/20 |
| 2020/0329072 A1* | 10/2020 | Dubois | H04L 63/20 |
| 2021/0273958 A1* | 9/2021 | McLean | H04L 63/1433 |
| 2021/0409427 A1* | 12/2021 | Patel | H04L 63/0236 |
| 2022/0109681 A1* | 4/2022 | Hamdi | H04L 43/0817 |
| 2023/0362184 A1* | 11/2023 | Gelman | H04L 63/1433 |
| 2024/0340293 A1* | 10/2024 | Patel | H04L 47/2483 |
| 2024/0356950 A1* | 10/2024 | Skarda | H04L 63/1433 |

* cited by examiner

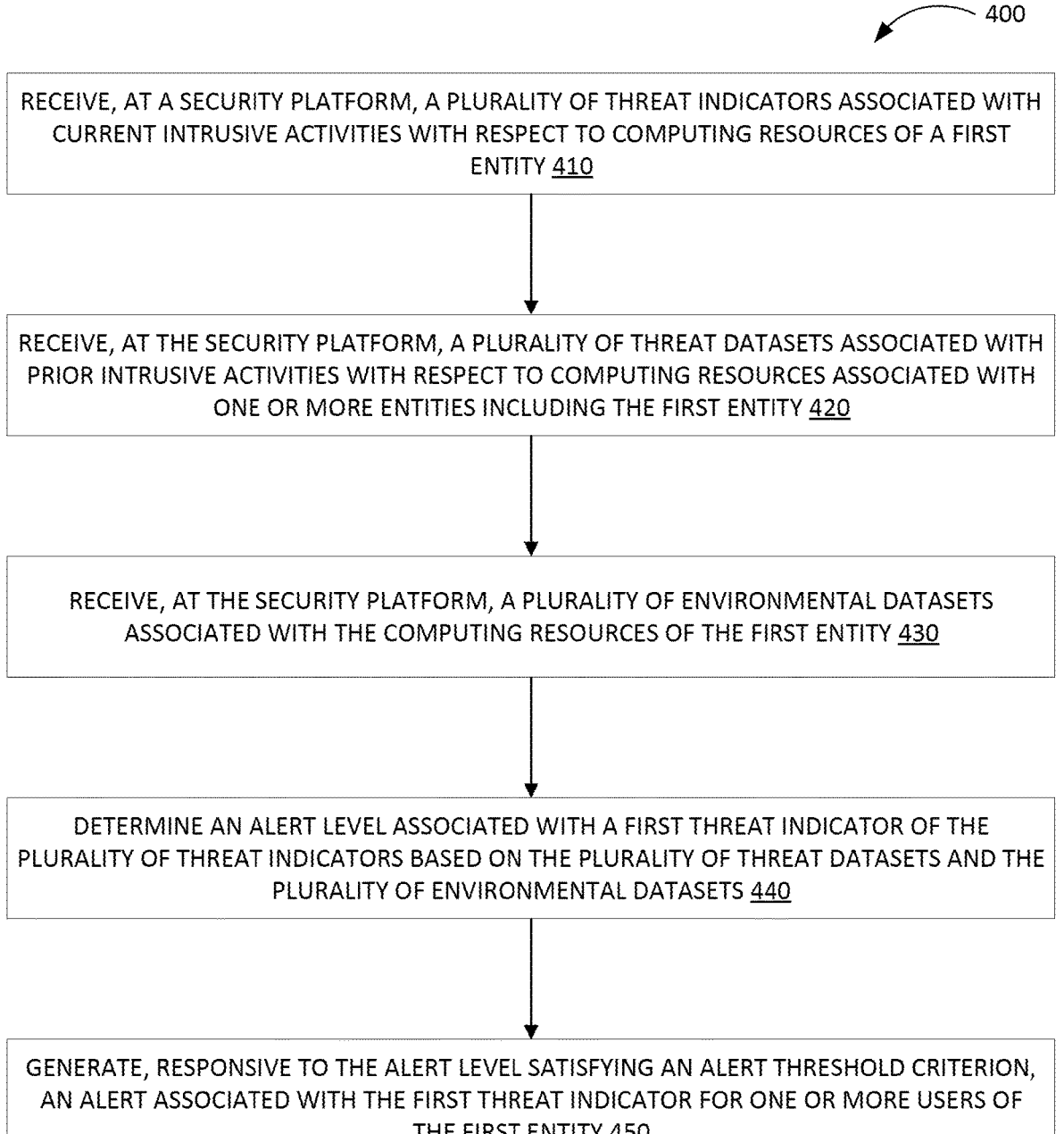

400

RECEIVE, AT A SECURITY PLATFORM, A PLURALITY OF THREAT INDICATORS ASSOCIATED WITH CURRENT INTRUSIVE ACTIVITIES WITH RESPECT TO COMPUTING RESOURCES OF A FIRST ENTITY 410

RECEIVE, AT THE SECURITY PLATFORM, A PLURALITY OF THREAT DATASETS ASSOCIATED WITH PRIOR INTRUSIVE ACTIVITIES WITH RESPECT TO COMPUTING RESOURCES ASSOCIATED WITH ONE OR MORE ENTITIES INCLUDING THE FIRST ENTITY 420

RECEIVE, AT THE SECURITY PLATFORM, A PLURALITY OF ENVIRONMENTAL DATASETS ASSOCIATED WITH THE COMPUTING RESOURCES OF THE FIRST ENTITY 430

DETERMINE AN ALERT LEVEL ASSOCIATED WITH A FIRST THREAT INDICATOR OF THE PLURALITY OF THREAT INDICATORS BASED ON THE PLURALITY OF THREAT DATASETS AND THE PLURALITY OF ENVIRONMENTAL DATASETS 440

GENERATE, RESPONSIVE TO THE ALERT LEVEL SATISFYING AN ALERT THRESHOLD CRITERION, AN ALERT ASSOCIATED WITH THE FIRST THREAT INDICATOR FOR ONE OR MORE USERS OF THE FIRST ENTITY 450

FIG. 4

THREAT INDICATOR ALERT GENERATION BASED ON PRIORITIZATION MODELS

RELATED APPLICATION

This application claims the benefit of U.S. Provisional Application No. 63/583,126, filed Sep. 15, 2023, the entire contents of which are hereby incorporated by reference herein.

TECHNICAL FIELD

Aspects and implementations of the present disclosure relate to computer security, and in particular to prioritizing alerts related to threat indicators with respect to computing resources.

BACKGROUND

Computing resources such as data centers and cloud computing platforms may be susceptible to intrusive activity (e.g., malware, network-based attacks). Intrusive activity can lead to interruption or inefficient operation of computing resources, which can be problematic for owners and operators of computing resources. In extreme cases, intrusive activity can damage computing resources or data stored thereon, potentially causing substantial financial loss and other losses and liabilities for the owners and operators of computing resources.

Security platforms typically have intrusive activity notification mechanisms in place that alert clients when potential intrusive activity is detected. The intrusive activity can then be mitigated, e.g., by blocking an intrusive file from being downloaded, stopping intrusive processes that are running, etc. Reviewing and acting on intrusive activity alerts is often a manual and time-consuming process for security professionals, which can result in human errors and can strain the human resources of security teams, thereby decreasing the overall effectiveness and threat coverage of the security platform.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

In some implementations, a system and method are disclosed for prioritizing and generating alerts associated with threat indicators. In an implementation, a method includes receiving, at a security platform, a plurality of threat indicators associated with current intrusive activities with respect to computing resources of a first entity. The method further includes receiving, at the security platform, a plurality of threat datasets associated with prior intrusive activities with respect to computing resources associated with one or more entities including the first entity. The method further includes receiving, at the security platform, a plurality of environmental datasets associated with the computing resources of the first entity. The method further includes determining an alert level associated with a first threat indicator of the plurality of threat indicators based on the plurality of threat datasets and the plurality of environmental datasets. The method further includes generating, responsive to the alert level satisfying an alert threshold criterion, an alert associated with the first threat indicator for one or more users of the first entity.

In some embodiments, a method further includes adding the first threat indicator to the plurality of threat datasets. In some embodiments, the first threat indicator of the plurality of threat indicators has associated metadata. The associated metadata includes a severity score, environmental data associated with the computing resources of the first entity, and at least one of network-based threat data or host-based threat data. In some embodiments, generating the alert is further responsive to the metadata of the first threat indicator satisfying an alert generation criterion.

In some embodiments, network-based threat data includes at least one of an internet protocol (IP) address, a domain name, or a universal resource locator (URL). In some embodiments, host-based threat data includes at least a file hash.

In some embodiments, determining the alert level associated with the first threat indicator includes identifying a prioritization model defined by the first entity. The prioritization model includes a score threshold and a plurality of metadata criteria. Determining the alert level further includes applying the prioritization model to the first threat indicator, the plurality of threat datasets, and the plurality of environmental datasets. Applying the prioritization model includes comparing the severity score of the first threat indicator to the score threshold of the prioritization model. Applying the prioritization model further includes evaluating the metadata of the first threat indicator against each of the plurality of metadata criteria of the prioritization model to determine the alert level.

In some embodiments, evaluating the metadata of the first threat indicator includes at least one of comparing the metadata of the first threat indicator to a first threat dataset of the plurality of threat datasets or comparing the metadata of the first threat indicator to a first environmental dataset of the plurality of environmental datasets.

In some embodiments, the prioritization model corresponds to a machine learning model, and at least one threat indicator of the plurality of threat indicators defines a set of features and respective labels that are included in training data to train the machine learning model. Each label of the respective labels indicates a target alert level based on one or more corresponding features of the set of features. The machine learning model is trained using the training data including the set of features representing training inputs and the respective labels representing target outputs for the training inputs.

In some embodiments, a method further includes receiving a new threat indicator. The method further includes applying the trained machine learning model to the new threat indicator to obtain a new alert level. The method further includes generating, responsive to the new alert level satisfying the alert threshold criterion, a new alert associated with the new threat indicator for the one or more users of the first entity.

In some embodiments a computer-readable storage medium (which may be non-transitory computer-readable storage medium, although the invention is not limited to that) stores instructions which, when executed, cause a processing device to perform operations comprising a method according to any embodiment or aspect described herein.

In some embodiments a system comprises: a memory device; and a processing device operatively coupled with the memory to perform operations comprising a method according to any embodiment or aspect described herein.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 4 depicts a flow diagram of an example method of generating threat indicator alerts, in accordance with at least one embodiment.

DETAILED DESCRIPTION

Figure 1:
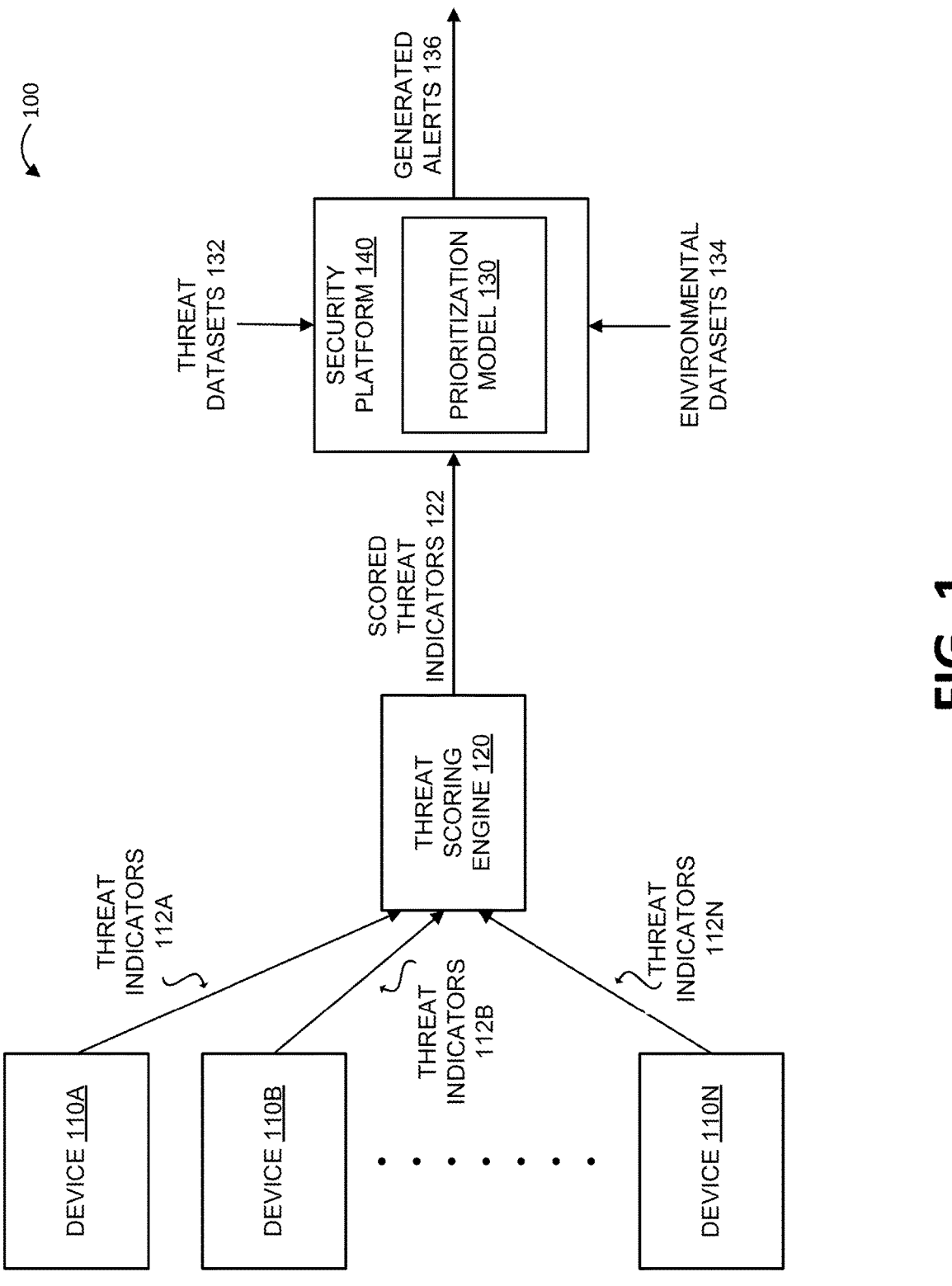
FIG. 1 illustrates an example data flow for generating threat indicator alerts, in accordance with at least one embodiment of the present disclosure.

Aspects of the present disclosure relate to generating alerts for threat indicators using a prioritization model. Threat indicators may indicate past or current intrusive activities with respect to computing resources. Computing resources may include, for example, servers, data centers, and cloud computing resources. Various computing resources may be susceptible to intrusive activity. Examples of intrusive activity include installation or operation of malware (e.g., malicious software), accessing or attempting to access computing resources without permission or authorization, modifying or exfiltrating data stored on computing resources without permission or authorization, exhausting computing resources (e.g., a denial-of-service attack), and other forms of unwanted activity. Intrusive activity is often problematic for owners and operators of computing resources because the intrusive activity can lead to interruption or inefficient operation of computing resources, or in extreme cases, substantial financial loss and liabilities. Malware is used herein as an example of intrusive activity, but intrusive activity often involves many other components such as those mentioned above, which are also within the scope of the present disclosure.

A security platform may provide services for detecting intrusive activity with respect to computing resources, enabling timely mitigation before the intrusive activity causes significant harm. For example, a security platform may receive data from computing resources (e.g., system event logs or new files inbound from a network connection) and analyze the data for signs of intrusive activity. Detection rules may associate patterns in the data with different types of intrusive activity, and rule evaluation engines may evaluate rules on new data. Upon evaluating a rule and detecting potential intrusive activity, the security platform can issue an alert to the computing resources (e.g., via an API) or to the owners and operators of the computing resources (e.g., via email). The intrusive activity can then be automatically or manually mitigated in a timely manner, such as by blocking an intrusive file from being downloaded, stopping intrusive processes that are running, etc. Security information and event management (SIEM) products are examples of security platforms and may include software, hardware, and managed service components.

In conventional security platforms, security professionals (e.g., security analysts, security engineers, threat intelligence operators) can struggle with being overloaded with threat data. Oftentimes the security platform will issue too many alerts, overwhelming the security professionals and preventing them from being able to timely respond to the most urgent intrusive activities, resulting in needless consumption of computing resources and possible financial losses. In some cases, the alert might have accurate data (e.g., a valid internet protocol (IP) address) but the alert might not require any action from a security professional (e.g., non-malicious communication with a web server). In other cases, an alert with the same data (e.g., same IP address) might require immediate action (e.g., sending malicious exploitation traffic to a vulnerable service). It is difficult to manually review or build automated workflows to investigate and respond to these noisy alerts.

Aspects of the present disclosure address the above and other deficiencies by providing frameworks for generating alerts for threat indicators using a prioritization model that is based on threat data from previous intrusive activities and information about the computing environment of specific computing resources. A threat indicator may correspond to an indicator of compromise associated with forensic artifacts related to intrusive activities, such a domain name, IP address, universal resource locator (URL), registry keys, etc. Threat indicators related to intrusive activities may come from a variety of sources (e.g., user devices, servers, virtual machines, network routers, network firewalls, etc.). The threat indicators may include metadata, such as information about the computing environment of the source of the threat indicator (e.g., environmental data), network-based data (e.g., IP address, domain, URL), and/or host-based data (e.g., filename, file path, file hash). The threat indicators may be aggregated within a security platform and may be assigned a severity score. In some embodiments, a severity score is provided by a separate security tool. The threat indicators with severity scores and metadata (e.g., scored threat indicators) may be provided to a prioritization model that determines an alert level for the threat indicator. The prioritization model may evaluate the threat indicator based on the properties of the threat indicator (e.g., severity score, metadata, etc.). The prioritization model may compare properties of the threat indicator to properties of past intrusive activities (e.g., threat datasets) and/or environmental properties of the computing resources that the threat indicator came from (e.g., environmental datasets). Thus, the prioritization model can take into account other telemetry mechanisms beyond just the current threat indicator (e.g., past intrusive activities, other pre-computer analytics, environmental datasets, context regarding how the threat indicator was being observed, etc.) to determine an alert level for a threat indicator.

A threat dataset may include one or more threat indicators and associated metadata relating to past intrusive activities. The threat datasets may comprise raw data (e.g., copied unmodified from a data source), curated data (e.g., some data points and/or metadata added, removed, reordered, etc.), annotated data (e.g., labels added to data points), or a combination of the above. For example, time series log data may be annotated with labels indicating associated intrusive activity detections from an external intrusive activity detection tool. The threat datasets may aggregate data characterizing prior intrusive activities among one or more entities, such that an intrusive activity that affected a first entity can be detected by a second entity even if the second entity has not experienced that particular intrusive activity previously. In some embodiments, threat datasets may include information from third-party security platforms (e.g., Mandiant's in-house database of intelligence response consultants that are involved in active breach investigations). Parsing of telemetry logs to create threat indicators (e.g., those included in threat datasets from previous intrusive activities, threat indicators related to current intrusive activities, etc.) may be normalized to ensure a consistent structure of data such that the threat indicators can be prioritized based on contextual decisions (e.g., decisions related to one or more threat datasets, decisions related to one or more environmental datasets).

An environmental dataset may include information related to the computing environment of the computing resources of an entity. For example, an environmental dataset may include data related to the network architecture, firewall status, operating system, list of installed processes, list of running processes, and/or user of a particular computing resource of the entity. Additionally, an environmental dataset may include data related to observed behaviors and interactions with a network, a computing asset, a network resource, one or more files, a user, and/or other computing assets. Environmental datasets may be generated using automated tools (e.g., security tools, scanners, etc.) or may be provided by users of the entity.

In some embodiments, the prioritization model follows a decision tree to determine an alert level for the threat indicator. The prioritization model may be implemented using matching rules. In some embodiments, the matching rules may be updated automatically or on-demand to ensure the prioritization model does not become out of date. By continually updating the matching rules (e.g., the prioritization model), the alert generation can be tweaked and tuned based on the availability of new data. In some embodiments, the prioritization model may include a machine learning model that determines an alert level for the threat indicator.

After an alert level has been determined, if the alert level satisfies an alert threshold criterion (e.g., if the alert level is greater than a certain minimum value), an alert may be generated for the threat indicator. In some embodiments, an alert may be generated regardless of the alert level. In some embodiments, the alert may be generated for users of the computing resources that the threat indicator came from (e.g., owner of the computing resources, security professional responsible for the computing resources, etc.) In some embodiments, the alert can be surfaced in a SIEM (e.g., Google Chronicle). In some embodiments, the alert may be generated only if metadata of the threat indicator satisfies an alert generation criterion (e.g., an alert may be generated only if it relates to intrusive activity on a device that is included in a list of devices to monitor, an alert may be generated for all devices unless the device is on a list of devices to ignore, etc.). In some embodiments, the threat indicator is added to a threat dataset to improve the prioritization of future threat indicators.

Accordingly, security platforms using the techniques described herein can provide improved accuracy and efficiency when generating alerts for intrusive activity with respect to computing resources. Filtering threat indicators using a prioritization model that is based on past threat datasets and environmental datasets, including prioritization models incorporating machine learning (ML) models, may provide improved threat coverage while reducing false positives, even when processing large amounts of data that may be available to an SIEM (e.g., Google Chronicle). Thus, a security platform may experience reduced operating costs and improved latency and throughput, which may benefit clients as well and increase trust in the security platform.

FIG. 1 illustrates an example data flow 100 for generating threat indicator alerts, in accordance with at least one embodiment of the present disclosure. Devices 110A-N (e.g., computing resources) may generate corresponding threat indicators 112A-N (e.g., logs, files, data streams, etc.). Each threat indicator 112A-N may be assigned a severity score by threat scoring engine 120. In some embodiments, threat scoring engine 120 may be included as part of security platform 140, and threat scores may be assigned statically (e.g., using lookup tables, hash maps, etc.) such that the same threat indicator (e.g., same malicious file, same intrusive activity) always receives the same score. In some embodiments, threat scoring engine 120 is part of a separate security platform, such that threat scores are assigned by the separate security platform (e.g., Mandiant). A threat indicator may also include metadata, such as information about the computing environment of the device the threat indicator comes from (e.g., firewall status, network architecture, user information, operating system, etc.), network-based data related to the threat indicator (e.g., IP address, domain name, URL), and/or host-based data related to the threat indicator (e.g., filename, file path, file hash). Threat indicators may be assigned prioritization labels based on the associated metadata. The threat indicators with the associated metadata and severity scores (e.g., scored threat indicators 122) may be provided to security platform 140.

The prioritization labels of a threat indicator (e.g., metadata properties) may be evaluated (e.g., by prioritization model 130) one after another (e.g., chaining the prioritization labels together) to create a logic flow that determines a corresponding alert level of the threat indicator. In some embodiments, the priority labels can be implemented with a labeling process (e.g., YARA-L 2). Prioritization labels may be assigned based on a variety of sources, including curated threat feeds, third-party threat feeds, human incident response investigation feeds, and/or context of how a threat indicator is being observed. In some embodiments, the final priority is returned to the alerting rule (e.g., YARA-L) to aid in the prioritization of that alert, which can be used by downstream consumers, including case management systems, security orchestration, automation, and response (SOAR) platforms, and/or incident management systems to appropriately highlight the alert to a user (e.g., security analyst) and/or to start an automation workflow.

Security platform 140 may receive threat datasets 132 and environmental datasets 134, in addition to scored threat indicators 122. Security platform 140 may include prioritization model 130 to filter scored threat indicators 122 based on threat datasets 132 and environmental datasets 134. Security platform 140 may generate alerts (e.g., generated alerts 136) based on scored threat indicators 122 that have an alert level, determined by prioritization model 130, that satisfies an alert threshold criterion. Prioritization model 130 will be described in more detail with regard to FIGS. 3A-B.

Figure 5:
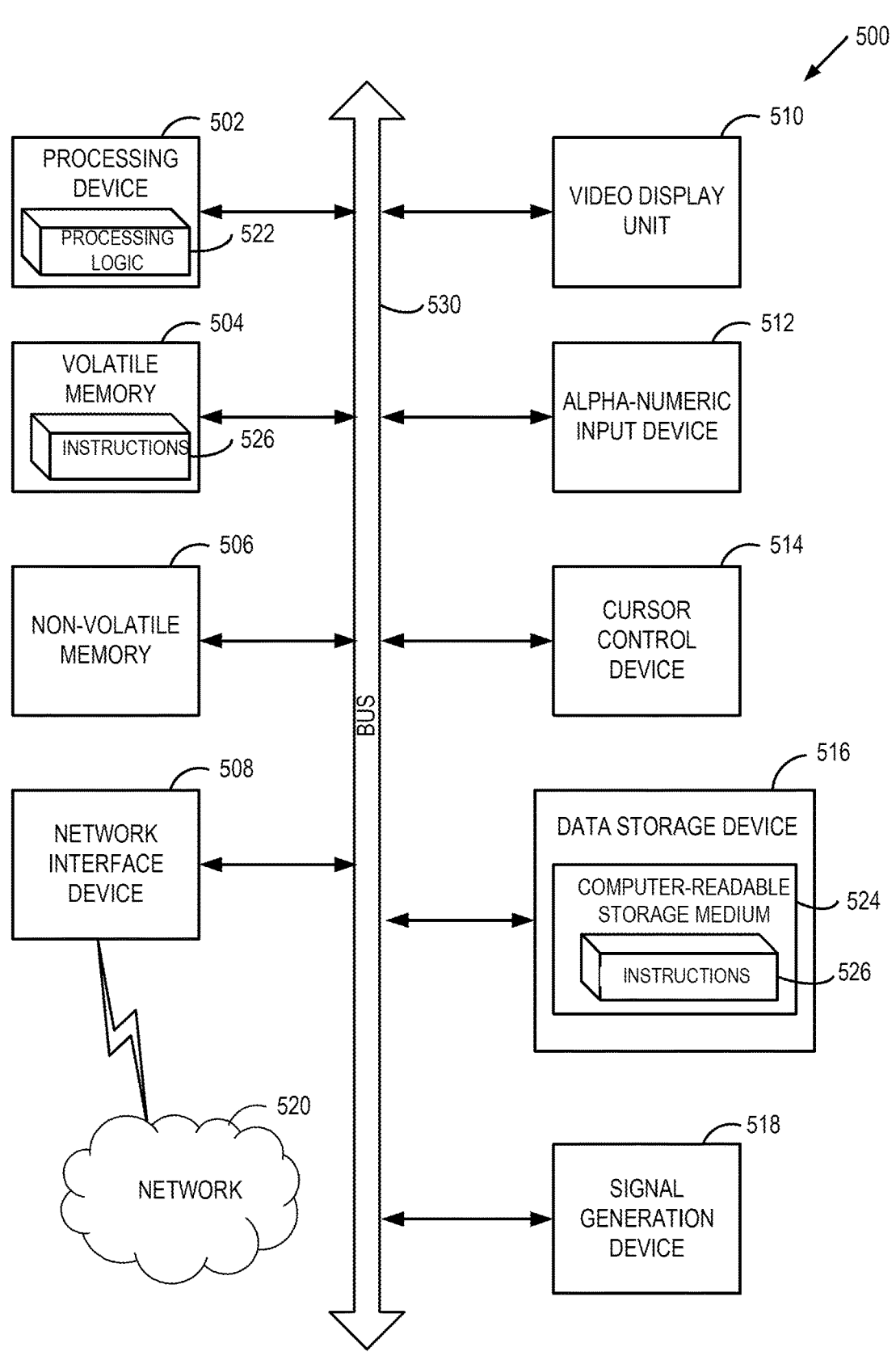
FIG. 5 is a block diagram illustrating an exemplary computer system, in accordance with at least one embodiment of the present disclosure.

Security platform 140 and devices 110A-N (e.g., computing resources) may be connected to a network, such as a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. Devices 110A-N may include one or more processing devices, volatile and non-volatile memory, data storage, one or more input/output peripherals such as network interfaces. FIG. 5 illustrates an example architecture of computing resources. In some embodiments, devices 110A-N may be singular devices such as smartphones, tablets, laptops, desktops, workstations, edge devices, embedded devices, servers, network appliances, security appliances, etc. In some embodiments, devices 110A-N may comprise multiple devices of similar or varying architecture such as computing clusters, data centers, co-located servers, enterprise networks, geographically disparate devices connected via virtual private networks (VPNs), etc. In some embodiments, devices 110A-N may comprise hardware devices such as those just described, virtual resources such as virtual machines (VMs) and containerized applications, or a combination of hardware and virtual resources. In some embodiments, devices 110A-N may be associated with one or more entities. For example, an entity may own or lease hardware devices such as a server or a data center. In another example, a client entity may lease virtual resources (e.g., a VM) from a provider entity. The provider entity may provision the virtual resources (along with virtual resources associated with other client entities) on hardware devices that the provider entity owns or leases itself.

Security platform 140 may provide security services for detecting intrusive activity with respect to devices 110A-N, such as scanning logs from devices 110A-N to detect signs of intrusive activity or scanning files (e.g., email attachments) from devices 110A-N to detect malware. Security platform 140 may issue alerts and/or take other actions upon detecting intrusive activity. In some embodiments, security platform 140 may include hardware devices or appliances (e.g., such as the computer system of FIG. 5), software applications, managed services, combinations of the above, etc. Security platform 140 may include one or more hardware or software interfaces for communicating with users, devices 110A-N, entities associated with devices 110A-N, and other relevant parties. For example, security platform 140 may include an application programming interface (API) for receiving data (e.g., logs and files) from and sending alerts to devices 110A-N. As a further example, security platform 140 may provide graphical user interfaces (GUIs), command line interfaces (CLIs), or APIs for interacting with other platforms, systems, and/or users such as security professionals. As a further example, security platform 140 may be configured to automatically send alert messages (e.g., emails, text messages, etc.) to users and/or entities associated with devices 110A-N. In some embodiments, interfaces such as those described above may utilize one or more hardware communication channels or protocols such as Ethernet, USB, PCIe, UART, I2C, SPI, etc. Users may interact with security platform 140 to create new data sets and rule generation policies, to automatically generate and test intrusive activity detection rules, and to move rules to and from a production environment where the rules may be used to detect subsequent intrusive activity.

In some embodiments, security platform 140 and devices 110A-N may be physically or virtually distinct from each other and communicatively connected by network (not shown). For example, devices 110A-N may be a data center at a first geographical location, and security platform 140 may be a software application residing on a server at a second geographical location. Security platform 140 and devices 110A-N may be associated with the same entity or with different entities. For example, devices 110A-N may be associated with a client entity and security platform 140 may be associated with a provider entity. The client entity may subscribe to the provider entity's security service and configure devices 110A-N to periodically send data (e.g., threat indicators) to security platform 140 for analysis. The provider entity may include one or more users (e.g., security researchers, security analysts, security engineers, or other security professionals employed by the provider entity) to develop, configure, and/or maintain the analysis capabilities of security platform 140, and the provider entity may configure security platform 140 to send alerts to devices 110A-N, the client entity, and/or the users in response to detecting intrusive activity. Security platform 140 may include an interface for users associated with the client entity (e.g., security researchers employed by the client entity) to configure security platform 140 as well. Cloud-based SIEM providers and software-as-a-service SIEM providers are examples of provider entities.

In some embodiments, security platform 140 may be a component of devices 110A-N. For example, devices 110A-N may be a data center (connected to a network, e.g., the Internet), and security platform 140 may be a server, virtual machine, containerized application, or other hardware or software component housed within the data center. A standalone SIEM product that may be installed on-premises at a data center is an example of security platform 140. A SIEM vendor may provide initial configuration for the SIEM product. If security platform 140 is housed within the same data center as devices 110A-N, security platform 140 may receive data from and issue alerts for devices 110A-N without a need for communication over a network. An entity associated with devices 110A-N may own or lease/license the hardware or software components of security platform 140. The entity associated with devices 110A-N may include one or more users (e.g., security researchers employed by the provider entity) to develop, configure, and/or maintain the analysis capabilities of security platform 140 (in addition to any initial configuration and support provided by a vendor of security platform 140).

In some embodiments, security platform 140 and devices 110A-N may be components of a computing platform such as a cloud computing platform (not shown). A provider entity associated with the cloud computing platform may offer to lease computing resources such as hardware devices, virtual machines, etc., and may provide security platform integrations in association with the leased computing resources. In some embodiments, devices 110A-N and/or security platform 140 may be distributed across multiple hardware devices (e.g., within a data center or across disparate geographical locations) and may be communicatively connected via internal networks, external networks, or a combination thereof. The provider entity may include various users (e.g., security researchers and other professionals/employees) to manage computing resources and security platform(s) of the cloud computing platform. A client entity may provision devices 110A-N along with security platform 140 (e.g., simultaneously or at different times). In some embodiments, the cloud computing platform may provide a dedicated security platform for each client entity (each client entity provisioning their own dedicated devices 110A-N). In some embodiments, the cloud computing platform may serve all client entities with a single security platform 140. A client may use a client configuration device to communicate with the cloud computing platform, provision devices 110A-N, and configure security platform 140. The client configuration device may be a hardware device such a laptop or a software application such as a web portal.

In some embodiments, a system architecture may differ from the example system architectures described above and may include more or fewer components than those described with respect to the example system architectures. For example, a system architecture may include a security platform as a component of the computing resources as well as an additional security platform connected over a network. In this example, an entity associated with the computing resources may desire benefits associated with having multiple security platforms, such as enhanced threat coverage or redundancy. Other system architectures are within the spirit and scope of the disclosure.

Figure 2:
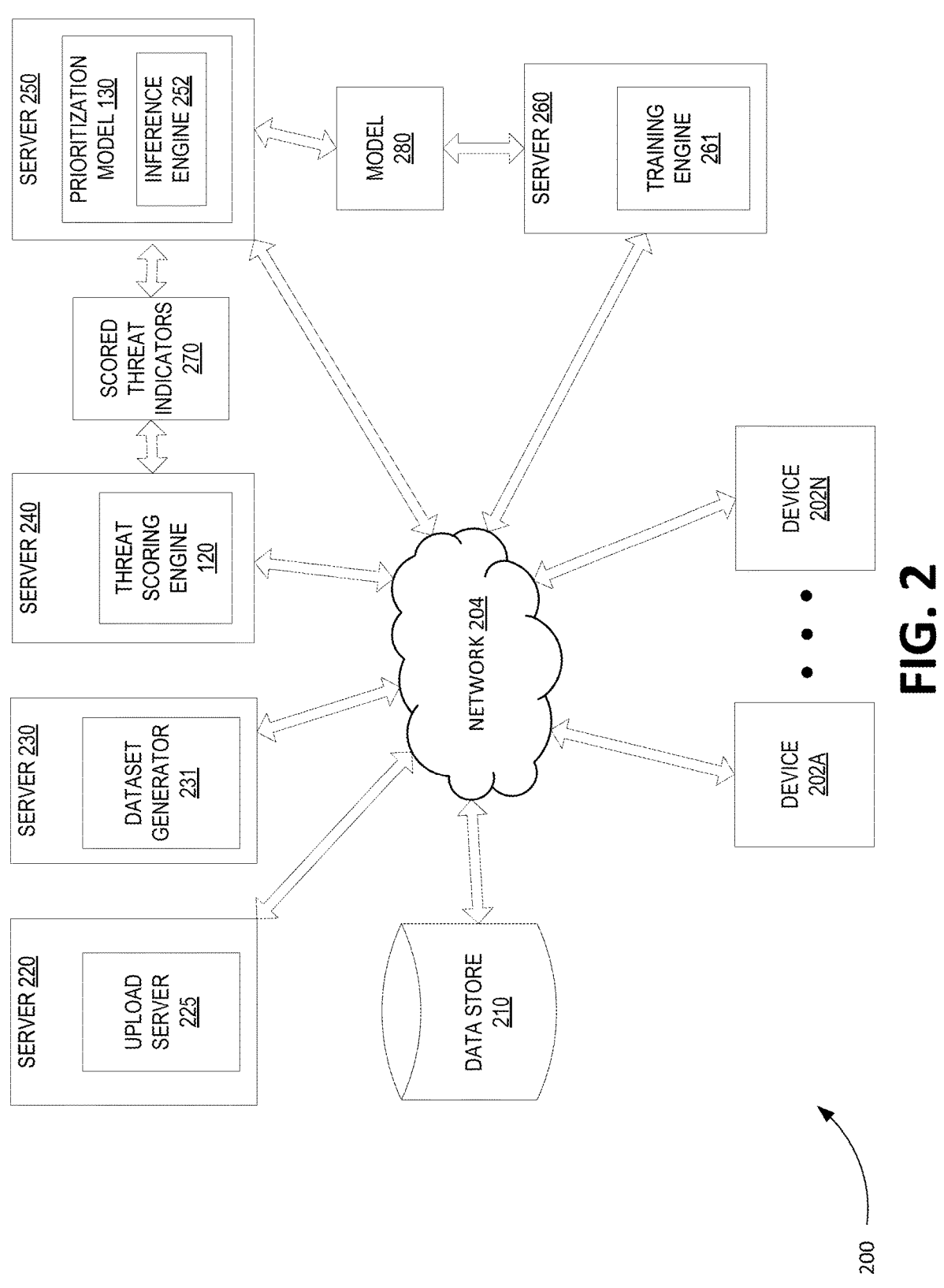
FIG. 2 illustrates an example security platform architecture that generates threat indicator alerts, in accordance with at least one embodiment.

FIG. 2 illustrates an example security platform architecture 200 that generates threat indicator alerts using a prioritization model, in accordance with at least one embodiment. In some embodiments, security platform architecture 200 may correspond to security platform 140 of FIG. 1. Security platform architecture 200 includes one or more servers 220, 230, 240, 250, and 260, a data store 210, and devices 202A-N connected to network 204. Each of servers 220, 230, 240, 250, and 260 may be a rackmount server, a router computer, a personal computer, a portable digital assistant, a mobile phone, a laptop computer, a tablet computer, a netbook, a desktop computer, a virtual machine, etc., or any combination of the above. In some embodiments, one or more of servers 220, 230, 240, 250, and 260 may be combined into a single server providing all of the components of the individual servers depicted in FIG. 2. Network 204 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In some embodiments, network 204 may be a physical or virtual interconnect within a single server providing all of the components of one or more of servers 220, 230, 240, 250, and 260. For example, network 204 may be a PCIe bus, a messaging system, or an API.

Devices 202A-N may be personal computers (PCs), laptops, mobile phones, tablet computers, digital assistants, servers, networking equipment, firewalls, other networking or security appliances, or any other computing devices. The computer system of FIG. 5 may be an example of such a computing device. Devices 202A-N may run an operating system (OS) that manages hardware and software of devices 202A-N. Devices 202A-N may be used by users such as security professionals, owners and operators of computing resources, and other types of users described with respect to FIG. 1. In some embodiments, devices 202A-N may upload threat datasets, information identifying data sources, data from the data sources, environmental datasets, and/or threat indicators to upload server 225 of server 220. In some embodiments, devices 202A-N may configure components of servers 220, 230, 240, 250, or 260. In some embodiments, devices 202A-N may correspond to the client configuration device described above.

Logs, journals, and other types of logging activity may be data sources for the security platform. For example, network traffic logs or process logs of computing resources may be imported into the security platform from a client entity or a third-party entity. Logs may also originate from sources internal to the security platform, such as sandbox environments. Logs may be unmodified or may be curated (e.g., modified, filtered) prior to import. Logs may include various fields useful for detecting intrusive activity, such as timestamps, process IDs, command line arguments, IP addresses and port numbers, etc. Similarly, libraries, repositories, and file systems that store files, email attachments, disk images, binary blobs, and other file-like data may be data sources for the security platform. Such data sources may include external sources and/or internal sources such as sandbox environments.

Data stores including threat feeds may be data sources for the security platform. Threat feeds may originate internal or external to the security platform and may provide intelligence on recent or relevant security threats. For example, threat feeds may include patterns or indicators (e.g., such as in logs or files) of intrusive activity related to recent cyberattacks, academic or commercial research, known vulnerabilities, etc. In some embodiments, data stores at external security platforms may be data sources for the security platform.

Data store 210 is a persistent storage that is capable of storing security platform content such as data sources, threat datasets, environmental datasets, threat indicators, machine learning models, configurations and settings, etc. Data store 210 may be hosted by one or more storage devices, such as main memory, magnetic or optical storage-based disks, tapes or hard drives, NAS, SAN, and so forth. In some embodiments, data store 210 may be a network-attached file server. In some embodiments, data store 210 may be some other type of persistent storage such as an object-oriented database, a relational database, and so forth. In some embodiments, data store 210 may be hosted on or may be a component of one or more of servers 220, 230, 240, 250, and 260. In some embodiments, data store 210 may be provided by a third-party service such as a cloud platform provider.

Server 230 includes dataset generator 231 that is capable of generating datasets (e.g., threat datasets, environmental datasets) from one or more data sources. Dataset generation may be automatic or may involve interaction with users, e.g., via devices 202A-N (e.g., using a GUI, CLI, API, etc.). Dataset generator 231 may aggregate threat indicators (e.g., from devices 202A-N, from data store 210). Dataset generator 231 may also generate training datasets for training machine learning models. Training datasets may comprise curated data with annotated training features in labels for supervised learning. Training datasets may comprise other structures as necessary for semi-supervised, self-supervised, and unsupervised learning. In at least one embodiment, dataset generator 231 may utilize data sources identified in the information received via upload server 225 or data from the data sources that was uploaded to upload server 225. In at least one embodiment, dataset generator 231 may utilize data stored in data store 210.

Server 240 includes threat scoring engine 120 that is capable of assigning a severity score to a threat indicator based on the intrusive activity indicated by the threat indicator. Threat scoring engine 120 may generate scored threat indicators 270. Assigning severity scores may be automatic or may involve interaction with users, e.g., via devices 202A-N (e.g., using a GUI, CLI, API, etc.). In at least one embodiment, threat scoring engine 120 may utilize datasets and/or threat indicators received via upload server 225. In at least one embodiment, threat scoring engine 120 may utilize datasets and/or threat indicators stored in data store 210. In at least one embodiment, scored threat indicators 270 may be stored in data store 210.

Server 260 includes training engine 261 that is capable of training a machine learning model such as model 280. Model 280 may refer to the model artifact that is created by training engine 261 using training data sets including, for example, features and labels from dataset generator 231. Training engine 261 may find patterns in the training data that map, for example, the training features to the target labels and may provide a machine learning model (model 280) that captures these patterns. The machine learning model may be composed of, e.g., a single level of linear or non-linear operations (e.g., a support vector machine (SVM) or may be a deep network, i.e., a machine learning model that is composed of multiple levels of non-linear operations. An example of a deep network is a neural network with one or more hidden layers, and such machine learning model may be trained by, for example, adjusting weights of a neural network in accordance with a backpropagation learning algorithm or the like. In some embodiments, model 280 may be part of a prioritization model (e.g., prioritization model 130) that determines an alert level for a given threat indicator.

Server 250 includes prioritization model 130 that is capable of assigning alert levels to live threat indicators. Prioritization model 130 may be part of a deployment or production environment of the security platform. In at least one embodiment, the live data (e.g., threat indicators) may be uploaded from computing resources (e.g., devices 110A-N of FIG. 1) via upload server 225. In at least one embodiment, prioritization model 130 may include inference engine 152 that is capable of performing inference on one or more machine learning models using the live data. Inference engine 152 may utilize machine learning domain-specific tooling or frameworks for optimized inferencing.

Prioritization model 130 may be configured by a user for a particular entity. In some embodiments, an entity may use more than one prioritization model (e.g., one prioritization model for network-based attacks and a second prioritization model for host-based attacks). In some embodiments, prioritization model 130 may be modified after processing a first threat indicator and before processing a second threat indicator of a plurality of threat indicators. In some embodiments, prioritization model 130 may be modified after all threat indicators of a plurality of threat indicators have been processed.

In general, functions described in one embodiment as being performed by the security platform or servers 220, 230, 240, 250, or 260 can also be performed external to the security platform. For example, dataset generation or threat scoring may be performed at devices 202A-N or at a third-party platform. In addition, the functionality attributed to a particular component can be performed by a different or multiple components operating together. The components of servers 220, 230, 240, 250, or 260 can also be accessed as a service provided to other systems or devices through appropriate APIs. These service components and APIs may be provided by or accessed by different entities. In some embodiments, functions described in one embodiment as being performed by the security platform or servers 220, 230, 240, 250, or 260 can also be performed by independent systems or services. Such systems and services may, for example, provide APIs to interoperate with one or more external security platforms (e.g., SIEM platforms), thereby providing the functions described herein for the external security platforms.

Figure 3A:
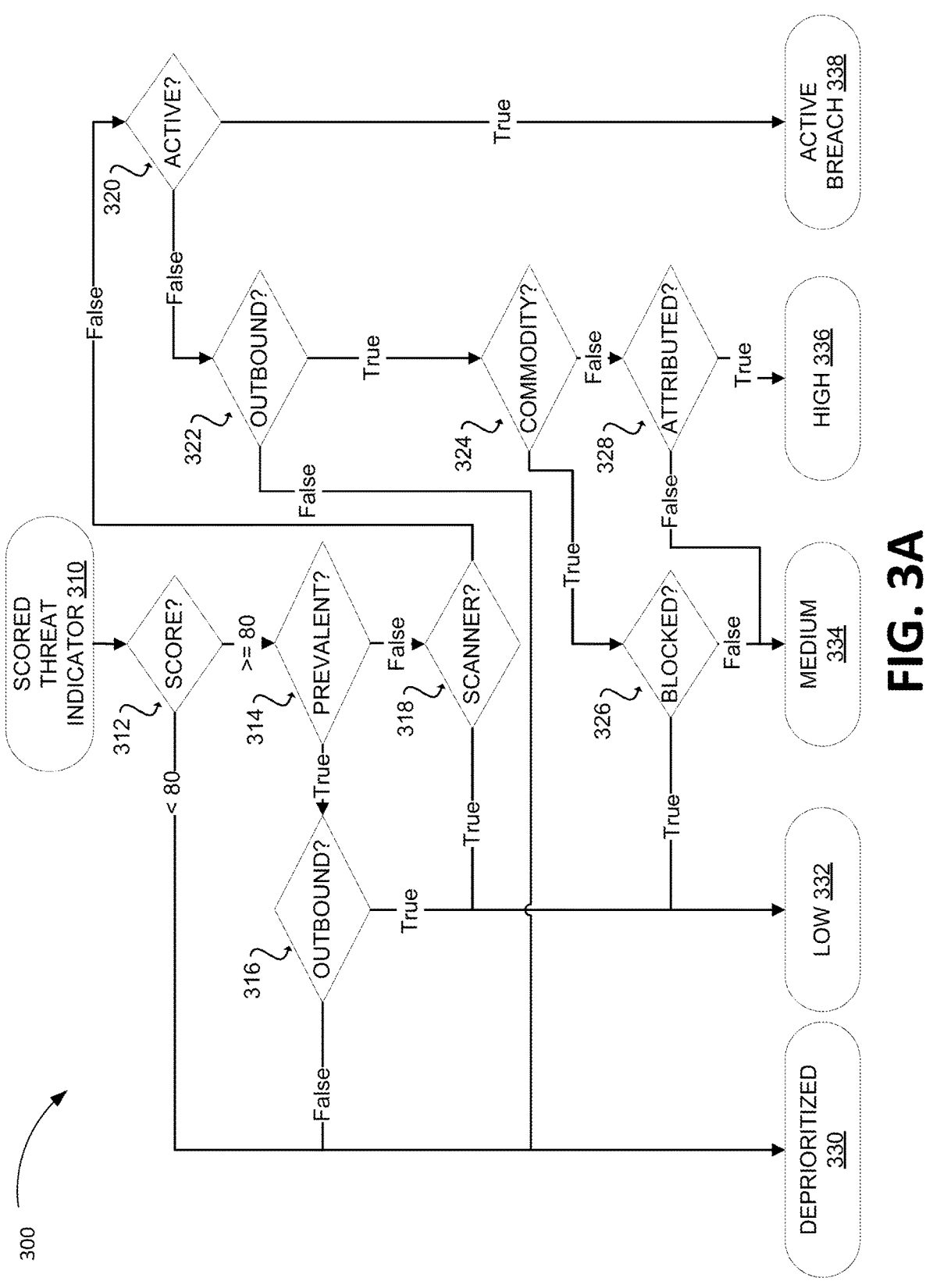
FIGS. 3A-B depict example flow diagrams illustrating determining the alert level of a threat indicator according to a prioritization model, in accordance with at least one embodiment.
Figure 3B:
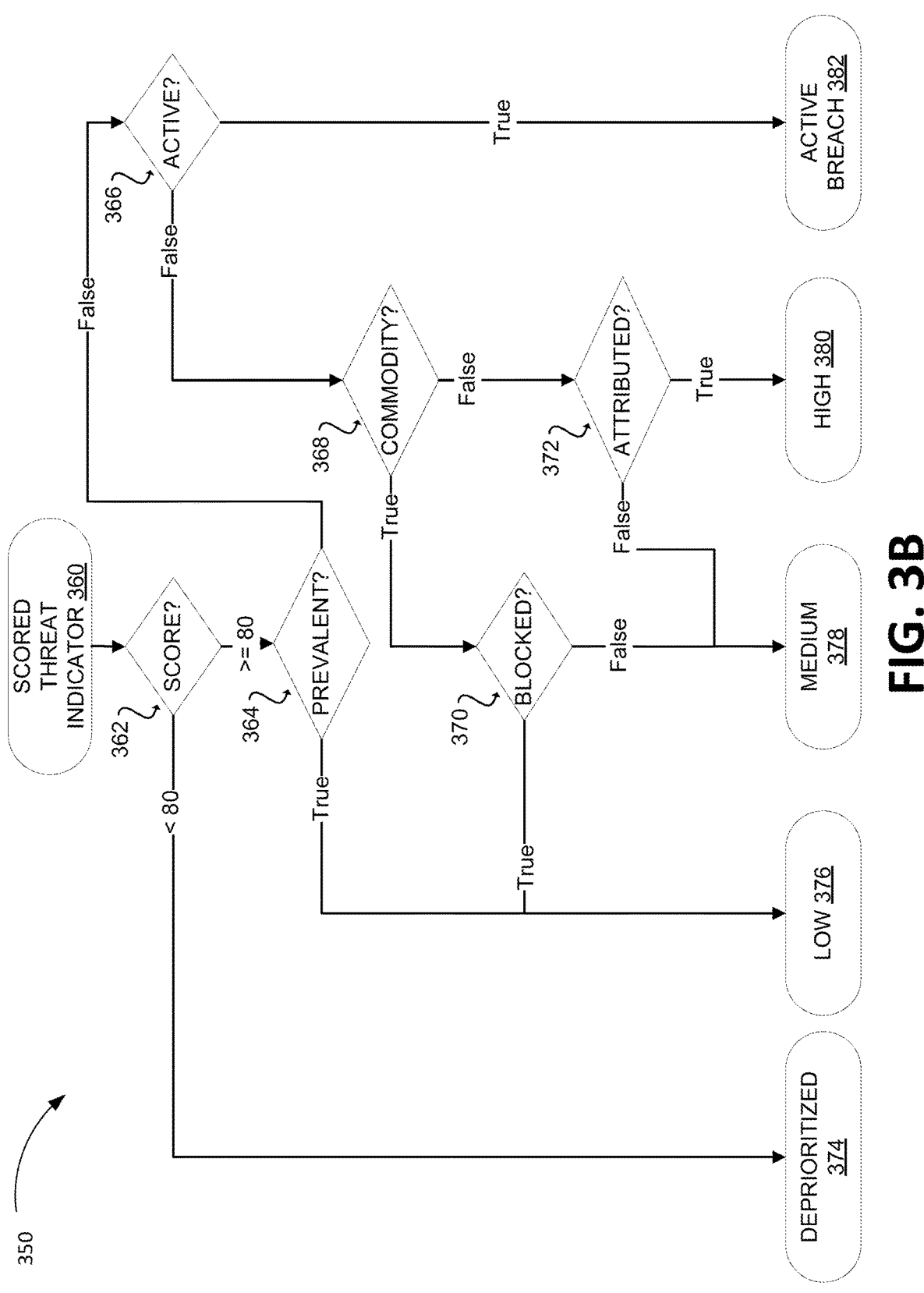

FIGS. 3A-B depict example flow diagrams 300 and 350 illustrating determining the alert level of a threat indicator according to a prioritization model, in accordance with at least one embodiment. Flow diagrams 300 and 350 may depict decision trees that are used, in some embodiments, to determine the appropriate alert level for a given threat indicator. In some embodiments, a machine learning model may be used as a prioritization model instead of a decision tree. In some embodiments, another method may be used to determine the alert level of a given threat indicator.

FIG. 3A depicts an example flow diagram 300 of determining the alert level of a threat indicator with associated network-based data. FIG. 3A depicts five different alert levels: DEPRIORITIZED 330, LOW 332, MEDIUM 334, HIGH 336, and ACTIVE BREACH 338. In some embodiments, there may be fewer (or more) available alert levels. For example, in some embodiments, only two alert levels (HIGH 336 and ACTIVE BREACH 338) may be used. In some embodiments, alert levels are represented as numerical values instead of words as shown here. In some embodiments, each word representation has a corresponding numerical value.

At block 310, a scored threat indicator (e.g., an indicator with a severity score and associated metadata) may be received. A sequence of evaluations may be performed on scored threat indicator 310 to determine the appropriate alert level for scored threat indicator 310. At block 312, the severity score of scored threat indicator 310 may be evaluated. If the score is less than 80 (e.g., on a scale from 0-100), scored threat indicator 310 may be assigned an alert level of DEPRIORITIZED 330. If the score is greater than or equal to 80, scored threat indicator 310 may be evaluated at block 314.

At block 314, scored threat indicator 310 may be evaluated against past threat data (e.g., threat datasets provided to the prioritization model) to determine whether or not this intrusive activity is prevalent. If the intrusive activity associated with scored threat indicator 310 is prevalent (e.g., has occurred frequently with computing resources of this entity, has occurred frequency with computing resources of another entity, etc.), scored threat indicator 310 may be evaluated at block 316; otherwise, scored threat indicator 310 may be evaluated at block 318. By filtering based on the prevalence of the intrusive activity associated with a threat indicator, many false positive alerts can be eliminated.

At block 316, network-based data associated with scored threat indicator 310 may be evaluated to determine whether the intrusive activity associated with scored threat indicator 310 corresponds to outbound network traffic. For example, if a destination IP address associated with the intrusive activity is external to the network of the computing environment of the device associated with the threat indicator, the intrusive activity may be considered "outbound." In such a case, scored threat indicator 310 may be assigned an alert level of LOW 332. If the intrusive activity is not considered "outbound," scored threat indicator 310 may be assigned an alert level of DEPRIORITIZED 330.

The example prioritization model for network-based intrusive activity depicted in FIG. 3A may consider outbound traffic (e.g., exfiltrating data) to be more dangerous than inbound traffic (e.g., potentially malicious requests), such that intrusive activity with associated outbound network traffic may be assigned a higher alert level than intrusive activity with associated network traffic that is not outbound. In other embodiments, a prioritization model for network-based intrusive activity may assign a lower alert level to outbound network traffic than to network traffic that is not outbound.

At block 318, scored threat indicator 310 may be evaluated to determine whether the associated intrusive activity is likely coming from a scanning device (e.g., port scanner, web crawler, etc.). If the intrusive activity is likely from a scanning device, scored threat indicator 310 may be assigned an alert level of LOW 332. If not, scored threat indicator 310 may be evaluated at block 320.

At block 320, scored threat indicator 310 may be evaluated to determine whether the intrusive activity indicates an active breach of the associated computing resources. If the intrusive activity is an active breach, scored threat indicator 310 may be assigned the highest possible alert level: ACTIVE BREACH 338. If the intrusive activity does not appear to be an active breach, a few additional evaluations may be performed before assigning an alert level to scored threat indicator 310, starting with block 322.

At block 322, network-based data associated with scored threat indicator 310 may be evaluated to determine whether the intrusive activity associated with scored threat indicator 310 corresponds to outbound network traffic. The evaluation may be similar (or the same as) the evaluation performed at block 316. However, block 316 evaluates scored threat indicators that have a severity score greater than or equal to 80 and have associated intrusive activity that is considered prevalent, whereas block 322 evaluates scored threat indicators that have a severity score greater than or equal to 80 and have associated intrusive activity that is not considered prevalent, is not considered to be from a scanner, and is not considered to be an active breach. If the intrusive activity associated with scored threat indicator 310 at block 322 is not considered "outbound," scored threat indicator 310 may be assigned an alert level of DEPRIORITIZED 330. If the intrusive activity associated with scored threat indicator 310 at block 322 is considered "outbound," scored threat indicator 310 may be evaluated at block 324.

At block 324, scored threat indicator 310 may be evaluated to determine, based on one or more threat datasets provided to the prioritization model, whether the associated intrusive activity is common knowledge in the security community. If the associated intrusive activity is considered common knowledge, scored threat indicator 310 may be evaluated at block 326; otherwise, scored threat indicator 310 may be considered by block 328.

At block 326, metadata associated with scored threat indicator 310 may be evaluated to determine whether or not the intrusive activity was successfully blocked (e.g., by a firewall). If the intrusive activity was blocked, scored threat indicator 310 may be assigned an alert level of LOW 332; otherwise, scored threat indicator 310 may be assigned an alert level of MEDIUM 334.

At block 328, scored threat indicator 310 may be evaluated, based on one or more threat datasets provided to the prioritization model, to determine whether the associated intrusive activity is strongly associated with an identified threat actor. If so, scored threat indicator 310 may be assigned an alert level of HIGH 336. If not, scored threat indicator 310 may be assigned an alert level of MEDIUM 334.

FIG. 3B depicts an example flow diagram 350 of determining the alert level of a threat indicator with associated host-based data. FIG. 3B depicts five different alert levels: DEPRIORITIZED 374, LOW 376, MEDIUM 378, HIGH 380, and ACTIVE BREACH 382. In some embodiments, there may be fewer (or more) available alert levels. For example, in some embodiments, only two alert levels (HIGH 380 and ACTIVE BREACH 382) may be used. In some embodiments, alert levels are represented as numerical values instead of words as shown here. In some embodiments, each word representation has a corresponding numerical value.

At block 360, a scored threat indicator (e.g., an indicator with a severity score and associated metadata) may be received. A sequence of evaluations may be performed on scored threat indicator 360 to determine the appropriate alert level for scored threat indicator 360. At block 362, the severity score of scored threat indicator 360 may be evaluated. If the score is less than 80 (e.g., on a scale from 0-100), scored threat indicator 360 may be assigned an alert level of DEPRIORITIZED 374. If the score is greater than or equal to 80, scored threat indicator 360 may be evaluated at block 364. In some embodiments, severity scores may be assigned on a different scale (e.g., a scale from 0-10, a scale from 1-5, etc.).

At block 364, scored threat indicator 360 may be evaluated against past threat data to determine whether the intrusive activity associated with scored threat indicator 360 is prevalent. If the intrusive activity associated with scored threat indicator 360 is considered prevalent, scored threat indicator 360 may be assigned an alert level of LOW 376; otherwise, scored threat indicator 360 may be evaluated at block 366.

At block 366, scored threat indicator 360 may be evaluated to determine whether the associated intrusive activity indicates an active breach of the associated computing resources. If the intrusive activity is an active breach, scored threat indicator 360 may be assigned the highest possible alert level: ACTIVE BREACH 382. If the intrusive activity does not appear to be an active breach, scored threat indicator 360 may be evaluated at block 368.

At block 368, scored threat indicator 360 may be evaluated to determine, based on one or more threat datasets provided to the prioritization model, whether the associated intrusive activity is common knowledge in the security community. If the associated intrusive activity is considered common knowledge, scored threat indicator 360 may be evaluated at block 370; otherwise, scored threat indicator 360 may be considered by block 372.

At block 370, metadata associated with scored threat indicator 360 may be evaluated to determine whether the intrusive activity was successfully blocked (e.g., by an anti-malware software). If the intrusive activity was blocked, scored threat indicator 360 may be assigned an alert level of LOW 332; otherwise, scored threat indicator 360 may be assigned an alert level of MEDIUM 334.

At block 372, scored threat indicator 360 may be evaluated, based on one or more threat datasets provided to the prioritization model, to determine whether the associated intrusive activity is strongly associated with an identified threat actor. If so, scored threat indicator 360 may be assigned an alert level of HIGH 380. If not, scored threat indicator 360 may be assigned an alert level of MEDIUM 334.

It is to be understood that the prioritization models depicted in FIGS. 3A-B are illustrative examples only. Some embodiments may have different prioritization models. In some embodiments, the prioritization model may require more (or fewer) evaluations to determine the appropriate alert level for a given scored threat indicator. In some embodiments, environmental data of the scored threat indicator may be compared to environmental data provided to the prioritization model. For example, an environmental dataset may be provided to the prioritization model indicating that a particular device (or group of devices) requires additional security measures. As such, the prioritization model may evaluate environmental data of the scored threat indicator to determine whether the threat indicator came from the particular device that requires additional security. If the intrusive activity is targeting that particular device, a higher alert level may be assigned to the threat indicator than if the intrusive activity was targeting another device.

After being assigned an alert level, the scored threat indicator may be provided to the security platform. The security platform (e.g., security platform 140 of FIG. 1) may generate an alert for the threat indicator if the alert level satisfies an alert threshold criterion. For example, in some embodiments, alerts may only be generated for those threat indicators with an associated alert level that exceeds MEDIUM.

In some embodiments, the threat indicator (or metadata of the threat indicator) may also need to satisfy an alert generation criterion in order to be generated. For example, a user of an entity (e.g., security professional) may create an alert generation criterion such that alerts from a particular device (or a group of devices) are never generated. For example, if a penetration test is being performed against a device, a lot of alerts, including potentially ACTIVE BREACH alerts, may be generated. In order to suppress these alerts, an alert generation criterion can be created such that only alerts from devices other than the penetration testing device are generated. In some embodiments, the alert generation criterion is temporary and may be removed after a period of time.

In some embodiments, threat indicators may be added to one or more threat datasets that are provided to the prioritization model in order to improve the filtering and the determination of future threat indicator alert levels. For example, if an intrusive activity occurs many times and is added to a threat dataset each time it occurs, a future intrusive activity of the same kind may be considered "prevalent" even though previous intrusive activities of that kind were not "prevalent." Thus, the prioritization model may adapt and improve over time, ensuring only the most important alerts are generated.

FIG. 4 depicts a flow diagram of an example method of generating threat indicator alerts, in accordance with at least one embodiment. Method 400 can be performed by processing logic that can include hardware (circuitry, dedicated logic, etc.), software (e.g., instructions run on a processing device), or a combination thereof. In at least one implementation, some or all of the operations of method 400 can be performed by one or more components of security platform architecture 200 of FIG. 2.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states e.g., via a state diagram. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

At block 410, processing logic receives, at a security platform, a plurality of threat indicators associated with current intrusive activities with respect to computing resources of a first entity. In at least one embodiment, the security platform may be security platform architecture 200 of FIG. 2. In at least one embodiment, the computing resources of the first entity may include devices 110A-N of FIG. 1 and/or devices 202A-N of FIG. 2. The plurality of threat indicators may include a variety of data characterizing intrusive activities, such as process or network logs (e.g., time series log data), malware binaries, binary patterns, binary file hashes, user-generated templates (e.g., permissions lists or configuration templates), rules or annotated data from external security platforms, etc. The threat indicators may comprise raw data (e.g., copied unmodified from the data source), curated data (e.g., some data points and/or metadata added, removed, reordered, etc.), annotated data (e.g., labels added to data points), or a combination of the above. For example, time series log data may be annotated with labels indicating associated intrusive activity detections from an external intrusive activity detection tool. In some embodiments, at least one threat indicator of the plurality of threat indicators may have associated metadata, which may include a severity score (e.g., assigned by an external security tool), environmental data associated with the computing resources of the first entity (e.g., which device and/or network is being affected by the intrusive activity), network-based threat data, and/or host-based threat data. Network-based threat data may include an internet protocol (IP) address, a domain name, and/or a universal resource locator (URL). Host-based threat data may include a filename, file path, and/or a file hash (e.g., MD5 hash, SHA-256 hash, etc.).

At block 420, processing logic receives, at the security platform, a plurality of threat datasets associated with prior intrusive activities with respect to computing resources associated with one or more entities including the first entity. The entities may be, for example, owners or operators of the computing resources, such as data center owners or cloud computing platform clients. Threat datasets may be received from a source internal to the security platform, such as a dataset generator 231 of FIG. 2, or from a source external to the security platform, such as from a user, an external security platform, or other external tools (e.g., machine learning tools). The threat datasets may include a variety of data characterizing prior intrusive activities, such as process or network logs, malware binaries, binary patterns, binary file hashes, user-generated templates, rules or annotated data from external security platforms, etc. The threat datasets may comprise raw data (e.g., copied unmodified from the data source), curated data (e.g., some data points and/or metadata added, removed, reordered, etc.), annotated data (e.g., labels added to data points), or a combination of the above. For example, time series log data may be annotated with labels indicating associated intrusive activity detections from an external intrusive activity detection tool. The threat datasets may aggregate data characterizing prior intrusive activities among one or more entities, such that an intrusive activity that affected a first entity can be detected by a second entity even if the second entity has not experienced that particular intrusive activity previously.

At block 430, processing logic receives, at the security platform, a plurality of environmental datasets associated with the computing resources of the first entity. The plurality of environmental datasets may include information related to the computing environment of the computing resources of the first entity. For example, an environmental dataset may include data related to the network architecture, firewall status, operating system, list of installed processes, list of running processes, and/or user of a particular computing resource of the first entity. By considering the plurality of environmental datasets when generating alerts for current intrusive activities, alerts relating to the most problematic intrusive activities for a particular computing environment can be generated while suppressing (or not generating) less important alerts.

At block 440, processing logic determines an alert level associated with a first threat indicator of the plurality of threat indicators based on the plurality of threat datasets and the plurality of environmental datasets. In some embodiments, determining the alert level associated with the first threat indicator may include identifying a prioritization model defined by the first entity. The prioritization model may include a score threshold and a plurality of metadata criteria. The prioritization model may be applied to the first threat indicator, the plurality of threat datasets, and the plurality of environmental datasets by comparing the severity score of the first threat indicator to the score threshold of the prioritization model and by evaluating the metadata of the first threat indicator against each of the plurality of metadata criteria of the prioritization model. In some embodiments, evaluating the metadata of the first threat indicator includes comparing the metadata of the first threat indicator to a first threat dataset of the plurality of threat datasets and/or comparing the metadata of the first threat indicator to a first environmental dataset of the plurality of environmental datasets.

At block 450, processing logic generates, responsive to the alert level satisfying an alert threshold criterion, an alert associated with the first threat indicator for one or more users of the first entity. For example, the alert threshold criterion may require that the determined alert level be higher than MEDIUM (or any other predetermined value) in order for an alert to be generated. In some embodiments, generating the alert is further responsive to the metadata of the first threat indicator satisfying an alert generation criterion. For example, during a penetration test, an alert generation criterion may be created such that any threat indicators coming from the device undergoing the penetration test are suppressed (e.g., not generated), even if the determined alert level satisfies the alert threshold criterion.

In some embodiments, processing logic may add the first threat indicator to the plurality of threat datasets to improve future prioritization and generation of alerts of threat indicators.

In at least one embodiment, the prioritization model corresponds to a machine learning model. At least one threat indicator of the plurality of threat indicators may define a set of features and respective labels that are included in training data to train the machine learning model. Each label of the respective labels may indicate a target alert level based on one or more corresponding features of the set of features. The machine learning model may be trained using the training data, which includes the set of features representing training inputs and the respective labels representing target outputs for the training inputs. Upon receiving a new threat indicator, processing logic may apply the trained machine learning model to the new threat indicator to obtain a new alert level. The processing logic may generate, responsive to the new alert level satisfying the alert threshold criterion, a new alert associated with the new threat indicator for the one or more users of the first entity.

FIG. 5 is a block diagram illustrating an exemplary computer system, in accordance with at least one embodiment of the present disclosure. The computer system 500 can correspond to devices 110A-N, described with respect to FIG. 1. The computer system 500 can also correspond to devices 202A-N and/or servers 220 through 260, described with respect to FIG. 2. Computer system 500 can operate in the capacity of a server or an endpoint machine in an endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 540.

Processor (processing device) 502 represents one or more general-purpose processing devices such as a microprocessor, central processing unit, or the like. More particularly, the processor 502 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 can also be one or more special-purpose processing devices such as an application specific integrated circuit (ASIC), a field programmable gate array (FPGA), a digital signal processor (DSP), network processor, or the like. The processor 502 is configured to execute instructions 505 (e.g., for generating threat indicator alerts) for performing the operations discussed herein.

The computer system 500 can further include a network interface device 508. The computer system 500 also can include a video display unit 510 (e.g., a liquid crystal display (LCD) or a cathode ray tube (CRT)), an input device 512 (e.g., a keyboard, and alphanumeric keyboard, a motion sensing input device, touch screen), a cursor control device 514 (e.g., a mouse), and a signal generation device 520 (e.g., a speaker). In some embodiments, computer system 500 may not include video display unit 510, input device 512, and/or cursor control device 514 (e.g., in a headless configuration).

The data storage device 518 can include a non-transitory machine-readable storage medium 524 (also computer-readable storage medium) on which is stored one or more sets of instructions 505 (e.g., for generating threat indicator alerts) embodying any one or more of the methodologies or functions described herein. The instructions can also reside, completely or at least partially, within the main memory 504 and/or within the processor 502 during execution thereof by the computer system 500, the main memory 504 and the processor 502 also constituting machine-readable storage media. The instructions can further be transmitted or received over a network 530 via the network interface device 508.

In one implementation, the instructions 505 include instructions for providing automatic rule generation and data-driven detection engineering systems. While the computer-readable storage medium 524 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one embodiment," "an implementation," or "an embodiment," means that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collected data is anonymized prior to performing any analysis to obtain any statistical patterns so that the identity of the user cannot be determined from the collected data.

What is claimed is:

1. A method comprising:
   receiving, at a security platform, a plurality of threat indicators associated with current intrusive activities with respect to computing resources of a first entity;
   receiving, at the security platform, a plurality of threat datasets associated with prior intrusive activities with respect to computing resources associated with one or more entities including the first entity;
   receiving, at the security platform, a plurality of environmental datasets associated with the computing resources of the first entity;
   determining an alert level associated with a first threat indicator of the plurality of threat indicators, wherein determining the alert level associated with the first threat indicator comprises applying a prioritization model defined by the first entity to the first threat indicator, based on the plurality of threat datasets and the plurality of environmental datasets; and
   generating, responsive to the alert level satisfying an alert threshold criterion, an alert associated with the first threat indicator for one or more users of the first entity.

2. The method of claim 1, further comprising adding the first threat indicator to the plurality of threat datasets.

3. The method of claim 1, wherein the first threat indicator of the plurality of threat indicators has associated metadata, wherein the associated metadata comprises a severity score, environmental data associated with the computing resources of the first entity, and at least one of network-based threat data or host-based threat data.

4. The method of claim 3, wherein generating the alert is further responsive to the metadata of the first threat indicator satisfying an alert generation criterion.

5. The method of claim 3, wherein the network-based threat data comprises at least one of:

an internet protocol (IP) address;

a domain name; or a universal resource locator (URL).

6. The method of claim 3, wherein the host-based threat data comprises at least a file hash.

7. The method of claim 3, wherein determining the alert level associated with the first threat indicator comprises:

identifying the prioritization model defined by the first entity, the prioritization model comprising a score threshold and a plurality of metadata criteria; and wherein applying the prioritization model comprises:

comparing the severity score of the first threat indicator to the score threshold of the prioritization model; and evaluating the metadata of the first threat indicator against each of the plurality of metadata criteria of the prioritization model to determine the alert level.

8. The method of claim 7, wherein evaluating the metadata of the first threat indicator comprises at least one of:

comparing the metadata of the first threat indicator to a first threat dataset of the plurality of threat datasets; or comparing the metadata of the first threat indicator to a first environmental dataset of the plurality of environmental datasets.

9. The method of claim 7, wherein:

the prioritization model corresponds to a machine learning model;

at least one threat indicator of the plurality of threat indicators defines a set of features and respective labels that are included in training data to train the machine learning model, wherein each label of the respective labels indicates a target alert level based on one or more corresponding features of the set of features; and the machine learning model is trained using the training data comprising:

the set of features representing training inputs; and the respective labels representing target outputs for the training inputs.

10. The method of claim 9, further comprising:

receiving a new threat indicator;

applying the trained machine learning model to the new threat indicator to obtain a new alert level; and generating, responsive to the new alert level satisfying the alert threshold criterion, a new alert associated with the new threat indicator for the one or more users of the first entity.

11. A system comprising:

a memory device; and a processing device coupled to the memory device, the processing device to perform operations comprising:

receiving, at a security platform, a plurality of threat indicators associated with current intrusive activities with respect to computing resources of a first entity;

receiving, at the security platform, a plurality of threat datasets associated with prior intrusive activities with respect to computing resources associated with one or more entities including the first entity;

receiving, at the security platform, a plurality of environmental datasets associated with the computing resources of the first entity;

determining an alert level associated with a first threat indicator of the plurality of threat indicators, wherein determining the alert level associated with the first threat indicator comprises applying a prioritization model defined by the first entity to the first threat indicator, based on the plurality of threat datasets and the plurality of environmental datasets; and generating, responsive to the alert level satisfying an alert threshold criterion, an alert associated with the first threat indicator for one or more users of the first entity.

12. The system of claim 11, the operations further comprising adding the first threat indicator to the plurality of threat datasets.

13. The system of claim 11, wherein the first threat indicator of the plurality of threat indicators has associated metadata, wherein the associated metadata comprises a severity score, environmental data associated with the computing resources of the first entity, and at least one of network-based threat data or host-based threat data.

14. The system of claim 13, wherein determining the alert level associated with the first threat indicator comprises:

identifying the prioritization model defined by the first entity, the prioritization model comprising a score threshold and a plurality of metadata criteria; and wherein applying the prioritization model comprises:

comparing the severity score of the first threat indicator to the score threshold of the prioritization model; and evaluating the metadata of the first threat indicator against each of the plurality of metadata criteria of the prioritization model to determine the alert level.

15. The system of claim 14, wherein evaluating the metadata of the first threat indicator comprises at least one of:

comparing the metadata of the first threat indicator to a first threat dataset of the plurality of threat datasets; or comparing the metadata of the first threat indicator to a first environmental dataset of the plurality of environmental datasets.

16. A non-transitory computer-readable medium comprising instructions that, when executed by a processing device, cause the processing device to perform operations comprising:

receiving, at a security platform, a plurality of threat indicators associated with current intrusive activities with respect to computing resources of a first entity;

receiving, at the security platform, a plurality of threat datasets associated with prior intrusive activities with respect to computing resources associated with one or more entities including the first entity;

receiving, at the security platform, a plurality of environmental datasets associated with the computing resources of the first entity;

determining an alert level associated with a first threat indicator of the plurality of threat indicators, wherein determining the alert level associated with the first threat indicator comprises applying a prioritization model defined by the first entity to the first threat indicator, based on the plurality of threat datasets and the plurality of environmental datasets; and responsive to the alert level satisfying an alert threshold criterion, generating an alert associated with the first threat indicator for one or more users of the first entity.

17. The non-transitory computer-readable medium of claim 16 further comprising instructions that, when executed by the processing device, cause the processing device to perform operations comprising adding the first threat indicator to the plurality of threat datasets.

18. The non-transitory computer-readable medium of claim 16, wherein the first threat indicator of the plurality of threat indicators has associated metadata, wherein the associated metadata comprises a severity score, environmental data associated with the computing resources of the first entity, and at least one of network-based threat data or host-based threat data.

19. The non-transitory computer-readable medium of claim 18, wherein determining the alert level associated with the first threat indicator comprises:

identifying the prioritization model defined by the first entity, the prioritization model comprising a score threshold and a plurality of metadata criteria; and wherein applying the prioritization model comprises:

comparing the severity score of the first threat indicator to the score threshold of the prioritization model; and evaluating the metadata of the first threat indicator against each of the plurality of metadata criteria of the prioritization model to determine the alert level.

20. The non-transitory computer-readable medium of claim 19, wherein:

the prioritization model corresponds to a machine learning model;

at least one threat indicator of the plurality of threat indicators defines a set of features and respective labels that are included in training data to train the machine learning model, wherein each label of the respective labels indicates a target alert level based on one or more corresponding features of the set of features; and the machine learning model is trained using the training data comprising:

the set of features representing training inputs; and the respective labels representing target outputs for the training inputs.

\* \* \* \* \*